(12) United States Patent
Enomoto

(10) Patent No.: US 7,051,830 B2
(45) Date of Patent: May 30, 2006

(54) OCCUPANT PROTECTION SYSTEM, VEHICLE USING SAME AND OCCUPANT PROTECTION METHOD

(75) Inventor: Takaaki Enomoto, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 281 days.

(21) Appl. No.: 10/318,084

(22) Filed: Dec. 13, 2002

(65) Prior Publication Data

US 2003/0111287 A1    Jun. 19, 2003

(30) Foreign Application Priority Data

Dec. 19, 2001  (JP) ............................ 2001-386515

(51) Int. Cl.
  *B80R 21/01* (2006.01)
(52) U.S. Cl. ...................... 180/274; 180/282
(58) Field of Classification Search ................ 180/274, 180/282
  See application file for complete search history.

(56) References Cited

U.S. PATENT DOCUMENTS 6,087,928 A      7/2000  Kleinberg et al.
6,666,292 B1 *  12/2003  Takagi et al. ................ 180/274

FOREIGN PATENT DOCUMENTS

| DE | 44 11 184 A1 | 10/1994 |
|---|---|---|
| DE | 196 47 660 A1 | 5/1998 |
| DE | 197 49 838 A1 | 6/1999 |
| JP | A 8-253098 | 10/1996 |
| JP | B2 2946995 | 7/1999 |
| JP | A 2000-198417 | 7/2000 |
| JP | A 2001-247009 | 9/2001 |

OTHER PUBLICATIONS

Dr. M. Kunert; "Radar-Based Near Distance Device for Precrash Sensing"; Sep. 30, 1999; vol. 471; pp 169-185.

* cited by examiner

*Primary Examiner*—Eric Culbreth
(74) *Attorney, Agent, or Firm*—Oliff & Berridge, PLC

(57) ABSTRACT

An occupant protection system activates at least one reversible occupant protection device installed in a vehicle and allowed for a repetitive operation. The occupant protection system includes an obstacle detector that detects a presence of an obstacle around the vehicle and a controller connected to the at least one reversible occupant protection device. The controller makes a prediction of a collision of the vehicle with the obstacle on the basis of a detection signal of the obstacle detector, makes a confirmation of the collision of the vehicle with the obstacle subsequent to the prediction of the collision, and activates the at least one reversible occupant protection device subsequent to the prediction, and cancels activation of the at least one reversible occupant protection device when no confirmation of the collision of the vehicle with the obstacle is made.

23 Claims, 3 Drawing Sheets

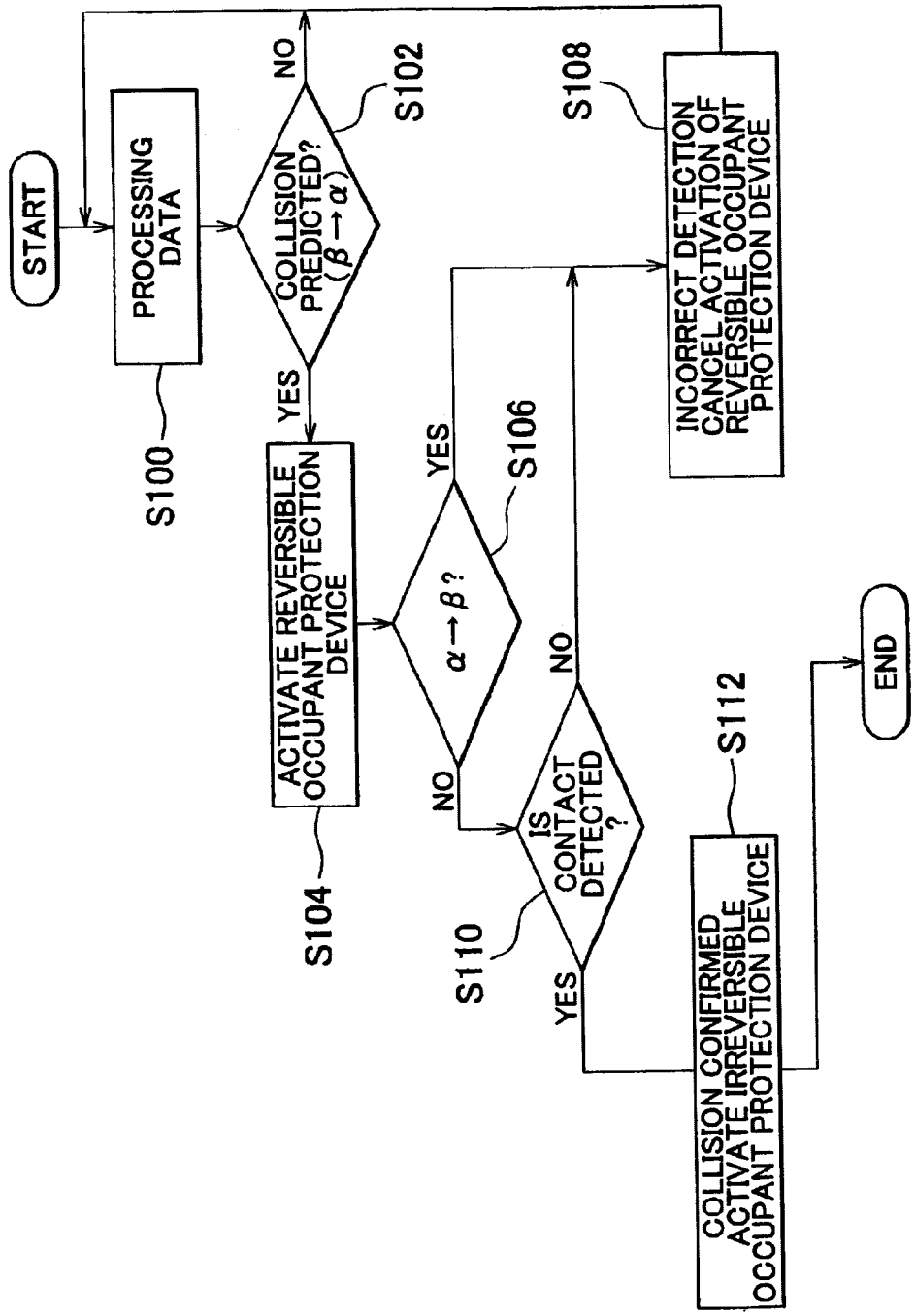

OCCUPANT PROTECTION SYSTEM, VEHICLE USING SAME AND OCCUPANT PROTECTION METHOD

INCORPORATION BY REFERENCE

The disclosure of Japanese Patent Application No. 2001-386515 filed on Dec. 19, 2001 including the specification, drawings and abstract is incorporated herein by reference in its entirety.

BACKGROUND OF THE INVENTION

1. Field of Invention

The invention relates to a system for improving occupant protection by accurately operating an occupant protection device such as a seatbelt device or an airbag device that is installed in a vehicle. More particularly, the invention relates to an occupant protection system that accurately activate an occupant protection device preliminarily operated before collision occurs on the basis of a collision prediction.

2. Description of Related Art

Conventionally, various devices are installed in a vehicle to improve occupant protection at the time of collision. This kind of occupant protection device includes an airbag device that deploys an airbag by igniting an explosive, and a seatbelt device with a pretensioner function that tightens the seatbelt by producing tension using an explosive or a spring. Conventionally, general occupant protection devices are designed to be activated at a moment when collision of the vehicle occurs. Once those occupant protection devices are activated, it is impossible to stop them. Accordingly they are called as irreversible devices. It is, thus, necessary to have an accurate confirmation of collision of the vehicle so as to activate those irreversible occupant protection devices.

Recently, an occupant protection device that is activated in response to a prediction of collision of a vehicle has been proposed in view of accurate occupant protection. The aforementioned device may allow improvement of the occupant protection by being preliminarily operated on the basis of the prediction prior to the actual collision.

An occupant protection device that is activated upon prediction of the collision includes, for example, a seatbelt device with a pretensioner that tightens slack in the seatbelt using a motor to prepare for a collision on the basis of the collision prediction. The aforementioned seatbelt device is disclosed in Japanese Patent Application Laid-Open Publication 2001-247009. The seatbelt device activates the pretensioner in response to the collision prediction, and cancels the activation after an elapse of a predetermined time period.

It is, therefore, possible for the aforementioned seatbelt device to cancel the operation when no collision occurs such that the seatbelt device is returned to the normal state. Unlike the irreversible occupant protection device that uses an explosive and the like, the aforementioned device may be called as reversible device that can be easily operated.

Conventionally, there is no disclosure with respect to the measure for coping with the operation of the reversible device on the basis of incorrect collision prediction.

When a collision is predicted but it is incorrect, it is desirable to bring the occupant protection device into a normal state as soon as possible. If the time for which the occupant protection device is operated is set to be relatively long, the occupant may be kept restrained with the pretensioner of the seatbelt device even after the collision is avoided. This makes the occupant uncomfortable. On the other hand, if the time elapsing from the collision prediction to the actual collision becomes relatively long, the operation of the occupant protection device is stopped. As a result, fundamental functions of the occupant protection device cannot be displayed.

Consequently, the need to control the occupant protection device that is preliminarily operated in response to the prediction prior to collision has been increasing while priority is placed on the occupant protection.

SUMMARY OF THE INVENTION

Therefore, an object of the invention is to provide an occupant protection system that can accurately operate a passenger protection device preliminarily in response to the collision prediction.

In an embodiment of the invention, an occupant protection system activates at least one reversible occupant protection device installed in a vehicle and allows for a repetitive operation. The occupant protection system is provided with an obstacle detector that detects a presence of an obstacle around the vehicle, and a controller connected to the at least one reversible occupant protection device. The controller makes a prediction of a collision of the vehicle with the obstacle on the basis of a detection signal of the obstacle detector, makes a confirmation of the collision of the vehicle with the obstacle subsequent to the prediction of the collision, and activates the at least one reversible occupant protection device subsequent to the prediction and cancels activation of the at least one reversible occupant protection device when no confirmation of the collision of the vehicle with the obstacle is made.

According to an embodiment of the invention, after the collision prediction is made, it is further determined whether the collision of the vehicle has occurred. If it is determined that the collision has not occurred, the operation of the reversible occupant protection device can be canceled. The occupant protection system of the invention is capable of controlling the operation of the reversible occupant protection device accurately in accordance with the state of the vehicle while placing priority on the occupant protection.

In the embodiment, the controller makes the confirmation of the collision subsequent to the prediction of the collision on the basis of the detection signal of the obstacle detector used for the prediction of the collision.

According to the embodiment of the invention, the detection signal of the obstacle detector for predicting collision of the vehicle can be used for determining actual collision of the vehicle. This may simplify the structure of the occupant protection system.

In the embodiment, a contact detector that detects a contact of the obstacle with the vehicle is provided. The controller makes a confirmation of the collision of the vehicle with the obstacle on the basis of at least one of the detection signal of the obstacle detector and a detection signal of the contact detector.

According to the embodiment of the invention, the collision of the vehicle can be confirmed using detection signals of the obstacle detector and the contact detector, respectively. Therefore, this may confirm the collision of the vehicle more accurately. The order of making the confirmation using the detection signals of the obstacle detector and the contact detector is not particularly specified.

In the embodiment, the obstacle detector detects at least a relative speed and a relative distance of the vehicle and the obstacle such that the controller makes the prediction and the confirmation of the collision of the vehicle with the obstacle in reference to a map including data defined by the relative speed and the relative distance.

According to the embodiment of the invention, a relative speed and a relative distance are obtained using the detection signals of the obstacle detector. The prediction and confirmation of the collision may be made referring to a point defined on a map by those relative speed and distance.

In the embodiment, the obstacle detector detects at least a relative speed and a relative distance of the vehicle and the obstacle such that the controller makes the prediction and the confirmation of the collision of the vehicle with the obstacle in reference to a map including data defined by the relative speed and the relative distance.

According to the embodiment of the invention, the collision can be easily confirmed using the detection signal of the contact detector.

In the embodiment, the controller is connected to at least one irreversible occupant protection device installed in the vehicle and allowed for no repetitive operation such that the controller activates the at least one irreversible occupant protection device subsequent to the confirmation of the collision of the vehicle with the obstacle.

According to the embodiment of the invention, the irreversible occupant protection device may be activated upon confirmation of the collision of the vehicle. The occupant protection system allows operation of the irreversible protection device such as an airbag when the collision of the vehicle has been confirmed while placing priority on the occupant protection.

BRIEF DESCRIPTION OF THE DRAWINGS

The foregoing and further objects, features and advantages of the invention will become more apparent from the following description of preferred embodiments with reference to the accompanying drawings, in which like numerals are used to represent like elements and wherein:

FIG. 3 is a flowchart that shows a processing routine that is implemented by a controller.

DETAILED DESCRIPTION OF PREFERRED EMBODIMENTS

Figure 1:
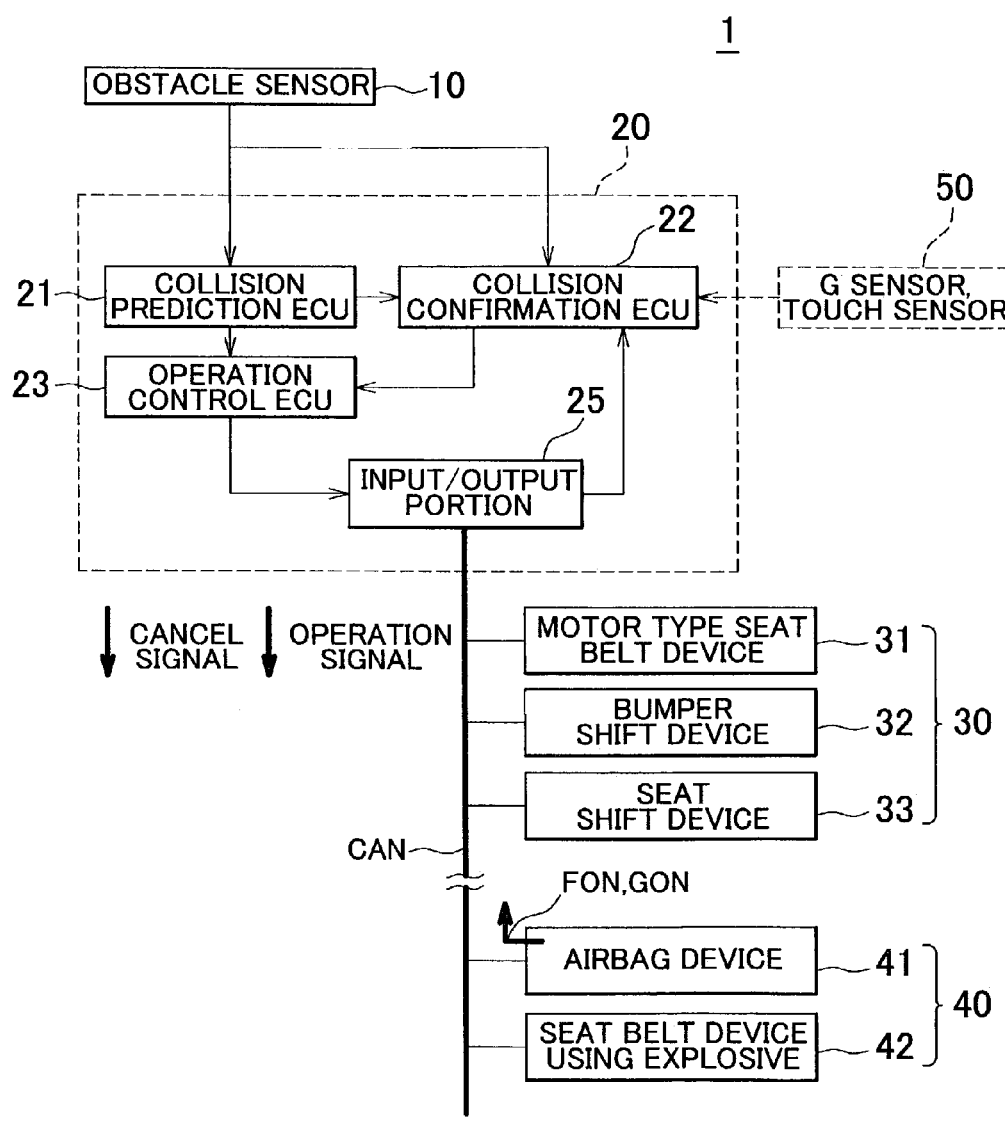
FIG. 1 is a block diagram that shows the schematic structure of an embodiment of an occupant protection system.

Hereinafter, an embodiment of an occupant protection system of the invention will be described with reference to the accompanying drawings. FIG. 1 is a block diagram that shows the structure of an occupant protection system 1 of the embodiment. Referring to FIG. 1, when an obstacle detector 10 detects an existence of an obstacle around the vehicle, the obstacle detector 10 sends a detection signal to a controller 20.

Various sensors for detecting obstacles around the vehicle, which may collide with the vehicle moving forward, can be widely adopted as the obstacle detector 10. For example, not only an electromagnetic wave sensor but also an ultrasonic sensor, an infrared sensor, a photo sensor and the like may be employed as the obstacle detector. It is preferable to use an electromagnetic wave sensor like a millimeter-wave sensor as the obstacle detector 10 that is capable of detecting a relative distance and a relative speed between the vehicle and the obstacle. Embedding the electromagnetic wave sensor in the front bumper of the vehicle may allow detection of the obstacle ahead of the vehicle. At least one electromagnetic wave sensor may be provided in the vehicle. Employment of multiple electromagnetic wave sensors each having different detection range makes it possible to carry out the collision prediction in multiple stages, thus improving accuracy in the collision prediction.

The controller 20 for controlling the entire occupant protection system 1 is formed of an electronic control unit (ECU). More particularly, the controller 20 includes a collision prediction ECU 21, a collision confirmation ECU 22, and an operation control ECU 23 that controls the operation of each occupant protection device, which will be described later.

The collision prediction ECU 21 confirms the presence of an obstacle for which there is a possibility of collision with the vehicle by referring to a detection signal from the obstacle detector 10. Then the collision prediction ECU 21 generates a collision prediction signal. For example, when the electromagnetic wave sensor is employed, the relative speed and the relative distance of the vehicle and the obstacle can be obtained. The collision prediction ECU 21 determines whether there is a possibility of the vehicle colliding with the obstacle by referring to the speed and acceleration of the vehicle. If the possibility of collision is high, the collision prediction ECU 21 generates a signal indicating the collision prediction.

Figure 2:
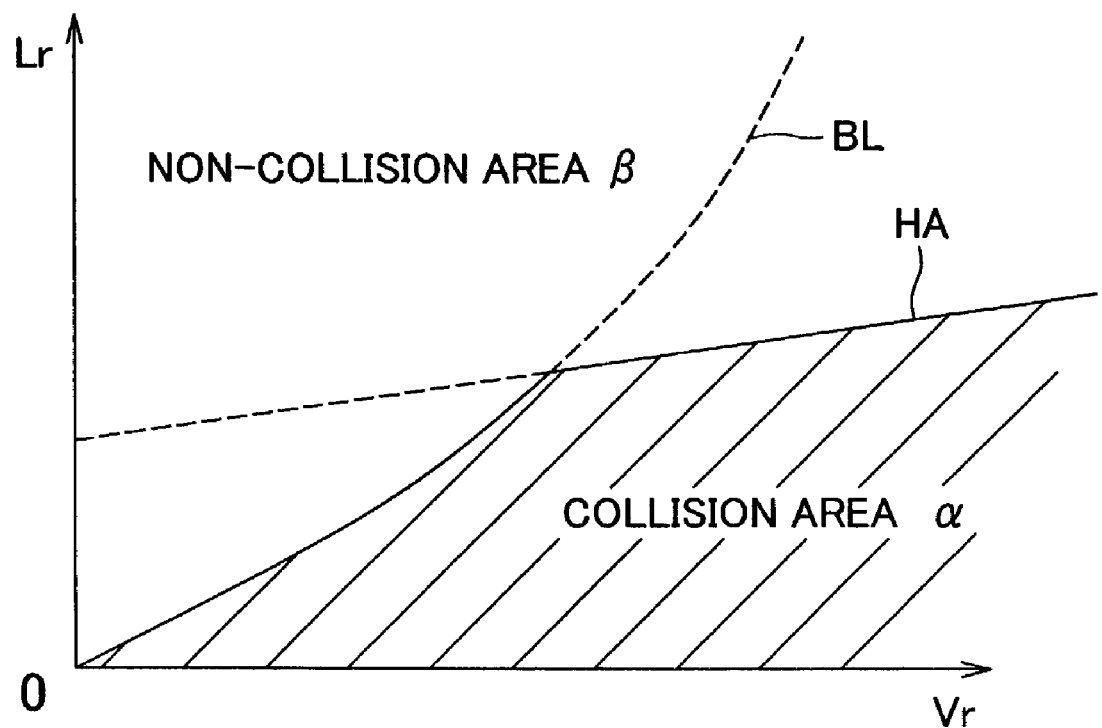
FIG. 2 is a graph that shows an example of a map used by a collision prediction ECU for the collision prediction.

The collision prediction ECU 21, for example, stores a map in a ROM and the like, and refers to the map based on which the collision prediction is carried out. FIG. 2 is a graph that shows an example of the map to which the collision prediction ECU 21 refers for the collision prediction.

Referring to the map shown in FIG. 2, the horizontal axis represents the relative speed Vr and the vertical axis represents the relative distance Lr. In this map, if a point defined by the relative speed and the relative distance detected by the obstacle detector 10 is within an area $\alpha$, it is determined that the vehicle will collide with the obstacle, that is, the collision is unavoidable (hereinafter referred to as a collision area $\alpha$). If the point is within an area $\beta$, it is determined that it is possible to avoid collision of the vehicle with the obstacle, that is, the collision is avoidable (hereinafter referred to as a non-collision area $\beta$).

The collision area $\alpha$ and the non-collision area $\beta$ are separated by, for example, a braking curve BL and a steering wheel curve HA. As the relative speed of the vehicle and the obstacle increases, the possibility of collision becomes higher even if the braking force is applied. The braking curve BL indicates the boundary between the collision area $\alpha$ and the non-collision area $\beta$. If the data value detected by the electromagnetic wave sensor is below the braking curve BL, the possibility of collision becomes high. Likewise, as the relative speed of the vehicle and the obstacle increases, the possibility of collision becomes higher even when the vehicle operator turns the steering wheel to avoid the collision. The steering wheel curve HA indicates the boundary between the collision area $\alpha$ and the non-collision area $\beta$. If the data value detected by the electromagnetic wave sensor is below the steering wheel curve HA, the possibility of the collision becomes higher.

The collision area $\alpha$ is defined as the area below the braking curve BL and the steering wheel curve HA. Consequently, when the state of the vehicle is determined as being within the collision area $\alpha$, it is predicted that the vehicle will collide with the obstacle with high probability even if the braking force is applied and the steering wheel is operated.

The collision prediction ECU 21 derives the relative speed Vr and the relative distance Lr from the data detected by the electromagnetic wave sensor, based on which a point is defined on the map as shown in FIG. 2. When the point is within the collision area α, the collision prediction ECU 21 generates the signal indicating the collision prediction. By using the map, the collision prediction can be easily carried out as described above. The map can be formed on the basis of data obtained by vehicle crash tests and simulations, for example. It is preferable that the map be prepared for each vehicle model and stored in the ROM that is accessible by the collision prediction ECU 21.

Referring to FIG. 1, the collision prediction signal generated by the collision prediction ECU 21 is sent to the operation control ECU 23 and the collision confirmation ECU 22. The respective ECUs 21 through 23 connect with a reversible occupant protection device 30 and irreversible occupant protection device 40 to be described later through a multiplex communication web CAN via a signal input and output portion 25.

Upon receipt of the collision prediction signal, the operation control ECU 23 immediately generates and sends a predetermined signal to the reversible occupant protection device 30 so as to be activated. As shown in FIG. 1, the reversible occupant protection device 30, a motor type seat belt device 31, a bumper shift device 32 and a seat shift device 33, for example. Those occupant protection devices are immediately activated upon the collision prediction so as to protect the occupant from collision.

The motor type seatbelt device 31 has a pretensioner that is driven by a motor to tighten the seatbelt. The protection of the occupant may be enhanced by preliminarily operating the pretensioner in response to the collision prediction. Also, the bumper shift device 32 is driven by the motor to shift the movably structured bumper forward in response to the collision prediction. This makes it possible to reduce the impact from the collision by preliminarily shifting the bumper forward in response to the collision prediction. Furthermore, the seat shift device 33 is driven by a motor to return the seat to a normal position. This makes it possible to protect the occupant from collision by returning the seat that has been too forward or too far backward to the normal position.

Each of the seatbelt device 31, the bumper shift device 32 and the seat shift device 33 can be brought into a normal state by canceling operation of the motor, that is, canceling the activation of those devices by stopping or reversing the operation of those devices so as to be returned into normal states. The drive source is not limited to a motor, and oil pressure and the like may be used.

The concept of the reversible occupant protection device 30 includes not only the occupant protection devices 31 through 33 as shown in FIG. 1 but also an airbag device in which a threshold value for determining a timing for activation is lowered in response to the collision prediction, and returned to the original value when the collision is avoided.

Furthermore, the operation control ECU 23 of the occupant protection system 1 also controls the operation of the generally employed irreversible occupant protection device 40. FIG. 1 shows an airbag device 41 that deploys an airbag using an explosive and a seatbelt device 42 with a pretensioner that tightens a seatbelt at once using an explosive as examples of the irreversible occupant protection device 40.

In the occupant protection system 1, when the signal indicating collision prediction is generated by the collision prediction ECU 21, and, further, when the collision is confirmed by the collision confirmation ECU 22 that will be described later, the operation control ECU 23 serves to activate the irreversible occupant protection device 40. The occupant protection system 1 makes it possible to ensure protection of the occupant by activating the irreversible occupant protection device 40 such as the airbag device in response to the collision confirmation by the collision confirmation ECU 22.

Next, an explanation of the collision confirmation ECU 22 will be described. The collision confirmation ECU 22 is provided to confirm that the vehicle collides with the obstacle subsequent to the collision prediction. The collision prediction ECU 21 predicts the collision of the vehicle with the obstacle with high probability based on the signal from the obstacle detector 10. However, the collision may be avoided after the collision prediction signal is generated by the collision prediction ECU 21. In the aforementioned case, it is preferable to return the reversible occupant protection device 30 into a normal state by canceling activation of the occupant protection device 30. The occupant protection system 1 is provided with the collision confirmation ECU 22 for ensuring the accurate control of the occupant protection device 30.

The collision confirmation ECU 22 confirms collision of the vehicle with the obstacle by referring to the map shown in FIG. 2 used by the collision prediction ECU 21 for the collision prediction.

When an electromagnetic wave sensor is used as the obstacle detector 10, the relative speed and the relative distance of the vehicle and the obstacle can be obtained. The collision prediction ECU 21 defines a point on the map by referring to the obtained relative speed Vr and the relative distance Lr. If the point is within the collision area α, the collision prediction ECU 21 generates the signal indicating the collision prediction.

In response to the collision prediction from the collision prediction ECU 21, the collision confirmation ECU 21 confirms that the vehicle has collided with the obstacle by monitoring the movement of the point within the collision area a. When the point within the collision area a moves into the non-collision area β, it is determined that the collision prediction is incorrect. In the case where a piece of metallic foil is blown across a road on which the vehicle is driving, and the foil is sensitively detected by the electromagnetic wave sensor, the point momentarily enters the collision area a and then disappears, and it is determined that the collision prediction is incorrect.

The collision confirmation ECU 22 estimates the time at which collision of the vehicle with the obstacle will occur based on the position of the point that has entered into the collision area α. The aforementioned time can be obtained by a simple calculation using the relative distance and the relative speed of the vehicle and the obstacle. If the collision does not occur after an elapse of the estimated time, it is determined that the collision prediction is incorrect.

If the occupant protection system is structured such that a signal FON for activating the airbag is sent to the collision confirmation ECU 22 from an airbag ECU (not shown) upon activation of the airbag device 41, it can be determined by the collision confirmation ECU 22 that the vehicle did not have a collision with the obstacle.

In the case where an empty box to which metal foil is attached has fallen on the road, and the vehicle passes over the box after the box is detected by the electromagnetic wave sensor, the collision does not occur even after an elapse of the estimated time subsequent to the collision prediction. In such a case, after the elapse of the estimated time, the point within the collision area α on the map will disappear.

In the case where the point remains within the area α even after the elapse of the estimated time, it is determined that there is an abnormality in the obstacle detector, that is, the electromagnetic wave sensor. In such a case, the occupant protection system may be structured such that the collision confirmation ECU 22 alarms the vehicle operator with respect to failure in the electromagnetic wave sensor. The alarm may be realized by illuminating an alarm lamp provided in the instrument panel of the vehicle or providing an arbitrary alarm device that audibly alarms the vehicle operator.

The collision confirmation ECU 22 further confirms the collision on the basis of a detection signal of a contact sensor of the occupant protection system 1. The contact sensor detects a contact of the vehicle with the obstacle detected by the obstacle detector. The contact sensor may be formed as a touch sensor that is embedded in the bumper or a deceleration sensor (G sensor) that detects an impact to the vehicle. The collision confirmation ECU 22 confirms an actual collision between the vehicle and the obstacle on the basis of the detection signal of this type of sensor. In the case where the G sensor is already provided for determining activation of the airbag device 41, it may be used for detecting the contact between the vehicle and the obstacle. When the G sensor of the airbag device 41 is employed, the occupant protection system 1 may be structured such that a deceleration signal GON is sent from the airbag ECU to the collision confirmation ECU 22 together with the airbag operation signal FON. The signal GON indicates that an impact greater than a predetermined value is generated upon collision. As shown by the reference numeral 50 in FIG. 1, a new G sensor or a touch sensor 50 may be provided in the bumper.

Each of the ECU 21 through 23 that constitutes the controller 20 connects with each reversible occupant protection device 30 and with each irreversible occupant protection device 40 through the multiplex communication web CAN via the signal input and output portion 25.

As described above, upon generation of the collision prediction signal by the collision prediction ECU 21, the operation control ECU 23 sends an operation signal through the multiplex communication web CAN to each reversible occupant protection device 30 for activation. When the collision confirmation ECU 22 determines that the collision prediction of the collision prediction ECU 21 is incorrect, the operation control ECU 23 sends a cancel signal to each reversible occupant protection device 30 through the multiplex communication web CAN.

Further, the airbag operation signal FON and the deceleration signal GON from the airbag device 41 are sent to the collision confirmation ECU 22 through the multiplex communication web CAN via the signal input and output portion 25.

Referring to a flowchart of FIG. 3, an example of the processing routine carried out by the controller 20 will be described. In this example, the electromagnetic wave sensor is employed as the obstacle detector 10, and the aforementioned map is employed for making the collision prediction and the collision confirmation.

In step S100 of the flowchart shown in FIG. 3, the collision prediction ECU 21 processes the detection signal from the electromagnetic wave sensor so as to monitor the obstacle for which there is a possibility of colliding with the vehicle. In step S102, it is determined whether a point defined by the relative speed and the relative distance of the obstacle and the vehicle on the map has moved from the non-collision area β into the collision area α so as to determine if there is a possibility of collision of the obstacle with the vehicle. If NO is obtained in step S102, that is, the point has remained in the non-collision area β, the map is repeatedly monitored.

Meanwhile, when YES is obtained in step S102, in other words, when the point has entered into the collision area α from the non-collision area β, the collision prediction signal is generated and sent to the operation control ECU 23 and the collision confirmation ECU 22, respectively.

In step S104, upon receipt of the collision prediction signal, the operation control ECU 23 immediately activates each reversible occupant device 30. Then in step S106, the collision confirmation ECU 22 further monitors the map used by the collision prediction ECU 21 for collision prediction, and determines whether the point entered into the collision area α has returned to the non-collision area β. When YES is obtained in step S106, in other words, when the point has returned to the non-collision area β, it is determined that the collision prediction is incorrect. Accordingly, the process proceeds to step S108 in which the collision confirmation ECU 22 sends the cancel signal to the operation control ECU 23. The operation control ECU 23 then generates a cancel signal so as to cancel activation of the reversible occupant protection device 30. This makes it possible to bring each of the occupant protection devices 30 into a normal state. The process routine, thus, returns to step S100.

Meanwhile when NO is obtained in step S106, in other words, when the point remains in the collision area α without returning to the non-collision area β, it is determined that the probability of collision of the obstacle with the vehicle is extremely high. The process then proceeds to step S110 where it is determined whether the obstacle collides with the vehicle on the basis of the detection signal from the contact detector. More particularly, in step S110, it is confirmed that the vehicle has actually collided with the obstacle on the basis of the detection signal from the contact sensor such as the touch sensor and the G sensor. If no collision is confirmed, it is determined that the collision prediction is incorrect. Then the process proceeds to step S108 and subsequent steps. Even in the case where an obstacle such as a cardboard box with low mass on the road is detected by the electromagnetic wave sensor and actually collides with the vehicle, it can be determined in step S110 that the collision confirmation is incorrect.

When YES is obtained in step S110, in other words, when the contact between the vehicle and the obstacle is detected by the contact sensor, it can be confirmed that the collision has occurred. The process then proceeds to step S112 where the irreversible occupant protection device 40 is activated, and the routine ends.

According to the processing routine, activation of the reversible occupant protection device 30 can be accurately controlled. This makes it possible to activate the airbag device and the seatbelt device with pretensioner using explosive in response to the actual collision. Accordingly, occupant protection can be further enhanced.

Further, according to the embodiment, the collision confirmation ECU 22 confirms collision of the vehicle with the obstacle in accordance with the map and the detection signals of the contact sensor. However, any one of the map and the contact sensor may be used for confirming the collision.

It is to be understood that the invention is not limited to the embodiment disclosed herein, and various modifications and changes are possible within the scope of the invention.

According to an embodiment of the invention, after the collision prediction is made, it is further determined whether the collision of the vehicle has occurred. If it is determined that the collision has not occurred, the operation of the reversible occupant protection device can be canceled. The occupant protection system of the invention is capable of controlling the operation of the reversible occupant protection device accurately in accordance with the state of the vehicle while placing priority on the occupant protection.

According to the embodiment of the invention, the detection signal of the obstacle detector for predicting collision of the vehicle can be used for determining actual collision of the vehicle. This may simplify the structure of the occupant protection system.

According to the embodiment of the invention, the collision of the vehicle can be confirmed using detection signals of the obstacle detector and the contact detector, respectively. Therefore, this may confirm the collision of the vehicle more accurately. The order of making the confirmation using the detection signals of the obstacle detector and the contact detector is not particularly specified.

According to the embodiment of the invention, a relative speed and a relative distance are obtained using the detection signals of the obstacle detector. The prediction and confirmation of the collision may be made referring to a point defined on a map by those relative speed and distance.

According to the embodiment of the invention, the collision can be easily confirmed using the detection signal of the contact detector.

According to the embodiment of the invention, the irreversible occupant protection device may be activated upon confirmation of the collision of the vehicle. The occupant protection system allows operation of the irreversible protection device such as an airbag when the collision of the vehicle has been confirmed while placing priority on the occupant protection.

What is claimed is:

1. An occupant protection system that activates at least one reversible occupant protection device installed in a vehicle and allowed for a repetitive operation, the occupant protection system comprising:
    an obstacle detector that detects a presence of an obstacle around the vehicle; and
    a controller connected to the at least one reversible occupant protection device, which
        makes a prediction of a collision of the vehicle with the obstacle on the basis of a detection signal of the obstacle detector;
        makes a confirmation of the collision of the vehicle with the obstacle subsequent to the prediction of the collision; and
        activates the at least one reversible occupant protection device subsequent to the prediction, and cancels activation of the at least one reversible occupant protection device when no confirmation of the collision of the vehicle with the obstacle is made while the prediction of a collision is continued.

2. An occupant protection system according to claim 1, wherein the reversible occupant protection device comprises one of a seatbelt device, a bumper shift device, and a seat shift device, each using a driving source.

3. An occupant protection system according to claim 1, wherein the controller makes the confirmation of the collision subsequent to the prediction of the collision on the basis of the detection signal of the obstacle detector used for the prediction of the collision.

4. An occupant protection system according to claim 3, further comprising a contact detector that detects a contact of the obstacle with the vehicle, wherein the controller makes a confirmation of the collision of the vehicle with the obstacle on the basis of at least one of the detection signal of the obstacle detector and a detection signal of the contact detector.

5. An occupant protection system according to claim 4, wherein the contact detector comprises one of a touch sensor and a G-sensor installed in the vehicle.

6. An occupant protection system according to claim 4, wherein the obstacle detector detects at least a relative speed and a relative distance of the vehicle and the obstacle such that the controller makes the prediction and the confirmation of the collision of the vehicle with the obstacle in reference to a map including data defined by the relative speed and the relative distance.

7. An occupant protection system according to claim 6, wherein the obstacle detector comprises at least one of an electromagnetic wave sensor, an ultrasonic sensor, an infrared sensor, and a photo sensor.

8. An occupant protection system according to claim 3, wherein the obstacle detector detects at least a relative speed and a relative distance of the vehicle and the obstacle such that the controller makes the prediction and the confirmation of the collision of the vehicle with the obstacle in reference to a map including data defined by the relative speed and the relative distance.

9. An occupant protection system according to claim 8, wherein the obstacle detector comprises at least one of an electromagnetic wave sensor, an ultrasonic sensor, an infrared sensor, and a photo sensor.

10. An occupant protection system according to claim 1, wherein the controller comprises a contact detector for detecting the contact between the vehicle and the obstacle.

11. An occupant protection system according to claim 1, wherein the controller is connected to at least one irreversible occupant protection device installed in the vehicle and allowed for no repetitive operation such that the controller activates the at least one irreversible occupant protection device subsequent to the confirmation of the collision of the vehicle with the obstacle.

12. An occupant protection system according to claim 1, wherein the controller estimates a time at which collision of the vehicle with the obstacle will occur, and cancels activation of the at least one reversible occupant protection device if the collision does not occur after an elapse of the estimated time.

13. A vehicle including at least one reversible occupant protection device allowed for repetitive operation, and an occupant protection system that activates the at least one reversible occupant protection device, wherein the occupant protection system comprises: an obstacle detector that detects a presence of an obstacle around the vehicle; and a controller connected to the at least one reversible occupant protection device for making a prediction of a collision of the vehicle with the obstacle on the basis of a detection signal of the obstacle detector, making a confirmation of the collision of the vehicle with the obstacle subsequent to the prediction of the collision, and for activating the at least one reversible occupant protection device subsequent to the prediction, and canceling activation of the at least one reversible occupant protection device when no confirmation of the collision of the vehicle with the obstacle is made while the prediction of a collision is continued.

14. A vehicle according to claim 13, further comprising at least one irreversible occupant protection device allowed for no repetitive operation so as to be activated by the controller subsequent to the confirmation of the collision of the vehicle with the obstacle.

15. An occupant protection system according to claim 13, wherein the controller estimates a time at which collision of the vehicle with the obstacle will occur, and cancels activation of the at least one reversible occupant protection device if the collision does not occur after an elapse of the estimated time.

16. An occupant protection method of activating at least one reversible occupant protection device installed in a vehicle and allowed for a repetitive operation, the method comprising:
   detecting a presence of an obstacle around the vehicle;
   making a prediction of a collision of the vehicle with the obstacle;
   making a confirmation of the collision of the vehicle with the obstacle subsequent to the prediction of the collision; and
   activating the at least one reversible occupant protection device subsequent to the prediction, and
   canceling activation of the at least one reversible occupant protection device when no confirmation of the collision of the vehicle with the obstacle is made while the prediction of a collision is continued.

17. An occupant protection method according to claim 16, wherein the confirmation of the collision is made subsequent to the prediction of the collision on the basis of a detection signal obtained by detecting the presence of the obstacle around the vehicle.

18. An occupant protection method according to claim 17, further comprising detecting a contact of the obstacle with the vehicle, wherein the confirmation of the collision is made on the basis of at least one of the detection signals obtained by detecting the presence of the obstacle around the vehicle and obtained by detecting the contact of the obstacle with the vehicle.

19. An occupant protection method according to claim 17, wherein at least a relative speed and a relative distance of the vehicle and the obstacle are detected for making the prediction and the confirmation of the collision.

20. An occupant protection method according to claim 18, wherein at least a relative speed and a relative distance of the vehicle and the obstacle are detected for making the prediction and the confirmation of the collision.

21. An occupant protection method according to claim 16, wherein the confirmation of the collision is made by detecting a contact between the obstacle and the vehicle.

22. An occupant protection method according to claim 16, further comprising activating at least one irreversible occupant protection device installed in the vehicle and allowed for no repetitive operation when the collision of the vehicle with the obstacle is confirmed.

23. An occupant protection method according to claim 16, further comprising:
   estimating a time at which collision of the vehicle with the obstacle will occur; and
   canceling activation of the at least one reversible occupant protection device if the collision does not occur after an elapse of the estimated time.

* * * * *